(12) United States Patent
Bayer et al.

(10) Patent No.: US 9,963,591 B2
(45) Date of Patent: *May 8, 2018

(54) POLYAMIDE MOLDING MATERIAL AND MOLDINGS MANUFACTURED FROM SAME

(71) Applicant: EMS-PATENT AG, Domat/Ems (CH)

(72) Inventors: Andreas Bayer, Domat/Ems (CH);
Nikolai Lamberts, Bonaduz (CH);
Botho Hoffmann, Domat/Ems (CH);
Manfred Hewel, Domat/Ems (CH);
Oliver Thomas, Domat/Ems (CH)

(73) Assignee: EMS-PATENT AG, Domat/Ems (CH)

( * ) Notice: Subject to any disclaimer, the term of this patent is extended or adjusted under 35 U.S.C. 154(b) by 699 days.

This patent is subject to a terminal disclaimer.

(21) Appl. No.: 13/971,376

(22) Filed: Aug. 20, 2013

(65) Prior Publication Data

US 2014/0171573 A1 Jun. 19, 2014

(30) Foreign Application Priority Data

Dec. 18, 2012 (EP) ..................................... 12197634

(51) Int. Cl.
*C08L 77/10* (2006.01)
*C08L 77/00* (2006.01)
*C08L 77/06* (2006.01)

(52) U.S. Cl.
CPC ............. *C08L 77/10* (2013.01); *C08L 77/00* (2013.01); *C08L 77/06* (2013.01); *C08L 2205/02* (2013.01)

(58) Field of Classification Search
USPC ....................................................... 524/126
See application file for complete search history.

(56) References Cited

U.S. PATENT DOCUMENTS

| | | |
|---|---|---|
| 2,516,585 A | 7/1950 | Pease |
| 3,454,536 A | 7/1969 | Schade et al. |
| 3,551,064 A | 12/1970 | Bartner |
| 3,600,336 A | 8/1971 | Okada et al. |
| 3,625,788 A | 12/1971 | Bartner |
| 4,036,811 A | 7/1977 | Noetzel et al. |
| 4,076,664 A | 2/1978 | Pagilagan |
| 4,212,777 A | 7/1980 | Goletto |
| 4,322,260 A | 3/1982 | Conlon |
| 4,345,066 A | 8/1982 | Rüter |
| 4,413,921 A | 11/1983 | Fotiu et al. |
| 4,537,949 A | 8/1985 | Schmidt et al. |

(Continued)

FOREIGN PATENT DOCUMENTS

| | | |
|---|---|---|
| CA | 861620 | 1/1971 |
| CA | 1109619 A1 | 9/1981 |

(Continued)

OTHER PUBLICATIONS

Korean Patent Office, Notice of Preliminary Rejection in Korean Patent Application No. 10-2013-0093551 (dated Nov. 20, 2014).

(Continued)

*Primary Examiner* — Ling Siu Choi
*Assistant Examiner* — Thuy-Ai N Nguyen
(74) *Attorney, Agent, or Firm* — Leydig, Voit & Mayer, Ltd.

(57) ABSTRACT

The present invention relates to heat-aging resistant polyamide molding materials based on partially crystalline, partially aromatic polyamides as well as to moldings manufactured therefrom.

18 Claims, 1 Drawing Sheet

(56) References Cited

U.S. PATENT DOCUMENTS

| | | |
|---|---|---|
| 4,540,772 A | 9/1985 | Pipper et al. |
| 4,603,166 A | 7/1986 | Poppe et al. |
| 4,607,073 A | 8/1986 | Sakashita et al. |
| 4,617,342 A | 10/1986 | Poppe et al. |
| 4,680,379 A | 4/1987 | Coquard et al. |
| 4,731,421 A | 3/1988 | Hoppe et al. |
| 4,826,951 A | 5/1989 | Coquard et al. |
| 4,831,106 A | 5/1989 | Kempter et al. |
| 4,831,108 A | 5/1989 | Richardson et al. |
| 4,847,356 A | 7/1989 | Hoppe et al. |
| 5,071,924 A | 12/1991 | Koch et al. |
| 5,081,222 A | 1/1992 | Reimann et al. |
| 5,098,940 A | 3/1992 | Brooks |
| 5,177,177 A | 1/1993 | Thullen et al. |
| 5,177,178 A | 1/1993 | Thullen et al. |
| 5,191,060 A | 3/1993 | Akkapeddi et al. |
| 5,210,860 A | 5/1993 | Pfeffer et al. |
| RE34,447 E | 11/1993 | Poppe et al. |
| 5,278,231 A | 1/1994 | Chundury |
| 5,302,691 A | 4/1994 | Soelch |
| 5,342,862 A | 8/1994 | Reich |
| 5,378,800 A * | 1/1995 | Mok et al. ............... 528/349 |
| 5,422,418 A | 6/1995 | Maj et al. |
| 5,480,945 A | 1/1996 | Vicik |
| 5,560,398 A | 10/1996 | Pfleger |
| 5,612,446 A | 3/1997 | Presenz et al. |
| 5,674,973 A | 10/1997 | Pipper et al. |
| 5,684,120 A | 11/1997 | Torre |
| 5,686,192 A | 11/1997 | Presenz et al. |
| 5,688,901 A | 11/1997 | Fisch et al. |
| 5,708,125 A | 1/1998 | Liedloff et al. |
| 5,773,556 A | 6/1998 | Kleiner et al. |
| 5,786,086 A | 7/1998 | Frihart et al. |
| 5,807,972 A | 9/1998 | Liedloff et al. |
| 5,917,004 A | 6/1999 | Liedloff et al. |
| 5,957,607 A | 9/1999 | Tsai |
| 6,008,288 A | 12/1999 | Dalla Torre |
| 6,075,116 A | 6/2000 | Moriwaki et al. |
| 6,204,355 B1 | 3/2001 | Dalla Torre et al. |
| 6,255,371 B1 | 7/2001 | Schlosser et al. |
| 6,270,560 B1 | 8/2001 | Kleiner et al. |
| 6,291,633 B1 | 9/2001 | Nakamura |
| 6,303,741 B1 | 10/2001 | Tanaka |
| 6,319,986 B1 | 11/2001 | Amimoto et al. |
| 6,365,071 B1 | 4/2002 | Jenewein et al. |
| 6,479,572 B1 * | 11/2002 | Weber ............... C08K 5/1345 524/126 |
| 6,547,992 B1 | 4/2003 | Schlosser et al. |
| 6,572,295 B1 | 6/2003 | Chochoy et al. |
| 6,706,790 B1 | 3/2004 | Berliet |
| 6,881,477 B2 | 4/2005 | Presenz et al. |
| 6,943,231 B2 | 9/2005 | Bühler |
| 7,014,315 B2 | 3/2006 | Iori et al. |
| 7,217,767 B2 | 5/2007 | Aguirre et al. |
| 7,249,844 B2 | 7/2007 | Sakai |
| 7,258,929 B2 | 8/2007 | Kanda et al. |
| 7,427,430 B2 | 9/2008 | Rhee et al. |
| 7,723,411 B2 | 5/2010 | Schneider |
| 7,807,245 B2 | 10/2010 | Bersted et al. |
| 7,807,742 B2 | 10/2010 | Tanaka et al. |
| 7,811,671 B2 | 10/2010 | Bushelman et al. |
| 7,981,518 B2 | 7/2011 | Sato |
| 8,022,170 B2 | 9/2011 | Hoffman et al. |
| 8,044,171 B2 | 10/2011 | Buhler et al. |
| 8,268,956 B2 | 9/2012 | Bühler et al. |
| 8,383,244 B2 | 2/2013 | Bayer et al. |
| 8,507,598 B2 | 8/2013 | Bühler et al. |
| 2001/0007888 A1 | 7/2001 | Asano |
| 2003/0018107 A1 | 1/2003 | Heinen et al. |
| 2003/0023008 A1 | 1/2003 | Uchida et al. |
| 2003/0126788 A1 | 7/2003 | Uang et al. |
| 2003/0130381 A1 | 7/2003 | Detlev et al. |
| 2003/0181585 A1 | 9/2003 | Handlin, Jr. et al. |
| 2003/0235666 A1 | 12/2003 | Bühler |
| 2004/0030023 A1 | 2/2004 | Buhler et al. |
| 2004/0158028 A1 | 8/2004 | Bühler |
| 2004/0230028 A1 | 11/2004 | Sato et al. |
| 2004/0242803 A1 | 12/2004 | Ohme et al. |
| 2005/0049339 A1 | 3/2005 | Knop et al. |
| 2005/0101708 A1 | 5/2005 | Knop et al. |
| 2006/0138391 A1 | 6/2006 | Drewes et al. |
| 2006/0235190 A1 | 10/2006 | Hoffman et al. |
| 2006/0264542 A1 | 11/2006 | Schneider |
| 2007/0072970 A1 | 3/2007 | Schneider |
| 2007/0104971 A1 | 5/2007 | Wursche et al. |
| 2007/0123632 A1 | 5/2007 | Rexin et al. |
| 2007/0172614 A1 | 7/2007 | Lee |
| 2007/0222941 A1 | 9/2007 | Sakai |
| 2007/0270544 A1 | 11/2007 | Bühler et al. |
| 2008/0135720 A1 | 6/2008 | Bühler et al. |
| 2008/0167415 A1 | 7/2008 | Stoeppelmann et al. |
| 2008/0207782 A1 | 8/2008 | Jacobs et al. |
| 2008/0274355 A1 | 11/2008 | Hewel |
| 2009/0127740 A1 | 5/2009 | Kirchner |
| 2009/0131569 A1 | 5/2009 | Schwitter et al. |
| 2009/0163634 A1 | 6/2009 | Bühler et al. |
| 2009/0247699 A1 | 10/2009 | Buehler et al. |
| 2010/0022742 A1 | 1/2010 | Bühler et al. |
| 2010/0028646 A1 | 2/2010 | Schwitter et al. |
| 2010/0036043 A1 | 2/2010 | Weber et al. |
| 2010/0130677 A1 | 5/2010 | Amici et al. |
| 2010/0227122 A1 | 9/2010 | Kumazawa et al. |
| 2010/0279111 A1 | 11/2010 | Philipp et al. |
| 2010/0297373 A1 | 11/2010 | Thullen et al. |
| 2010/0311882 A1 | 12/2010 | Eibeck et al. |
| 2011/0105655 A1 | 5/2011 | Harder et al. |
| 2011/0220667 A1 | 9/2011 | Pfleghar et al. |
| 2012/0029133 A1 | 2/2012 | Stoppelmann et al. |
| 2012/0237708 A1 | 9/2012 | Caviezel et al. |
| 2012/0321829 A1 | 12/2012 | Bayer et al. |
| 2013/0317168 A1 | 11/2013 | Bühler |
| 2014/0094548 A1 | 4/2014 | Roth et al. |
| 2014/0275392 A1 | 9/2014 | Bühler |

FOREIGN PATENT DOCUMENTS

| | | | |
|---|---|---|---|
| CA | 2008497 | * 8/1990 | ............ C08L 77/00 |
| CA | 2019904 | 1/1991 | |
| CA | 2066106 A1 | 10/1992 | |
| CA | 2078624 A1 | 3/1993 | |
| CH | 280367 | 1/1952 | |
| CN | 1167267 A | 12/1997 | |
| CN | 1467236 A | 1/2004 | |
| CN | 101050303 A | 10/2007 | |
| CN | 101357515 A | 2/2009 | |
| CN | 101405323 A | 4/2009 | |
| CN | 201741455 U | 2/2011 | |
| DE | 14 95 393 | 4/1969 | |
| DE | 24 47 727 A1 | 4/1976 | |
| DE | 26 42 244 A1 | 3/1977 | |
| DE | 2821333 A1 | 11/1978 | |
| DE | 36 00 015 A1 | 7/1986 | |
| DE | 90 01 242 U1 | 2/1991 | |
| DE | 40 05 894 A1 | 12/1991 | |
| DE | 43 29 676 A1 | 3/1994 | |
| DE | 195 13 940 A1 | 1/1996 | |
| DE | 195 37 614 A1 | 4/1997 | |
| DE | 199 20 276 A1 | 11/2000 | |
| DE | 199 33 901 A1 | 2/2001 | |
| DE | 102 24 947 A1 | 12/2003 | |
| DE | 102 59 048 A1 | 7/2004 | |
| DE | 696 32 529 T2 | 9/2004 | |
| DE | 103 16 873 A1 | 11/2004 | |
| DE | 103 46 326 A1 | 5/2005 | |
| DE | 694 28 832 T3 | 2/2007 | |
| DE | 102010023770 A1 | 12/2011 | |
| EP | 0 052 944 A1 | 6/1982 | |
| EP | 0 129 195 A2 | 12/1984 | |
| EP | 0 129 196 A2 | 12/1984 | |
| EP | 0 196 981 A1 | 10/1986 | |
| EP | 0 246 620 A2 | 11/1987 | |
| EP | 0 288 269 A1 | 10/1988 | |
| EP | 0 299 444 A2 | 1/1989 | |
| EP | 0 325 923 A2 | 8/1989 | |

(56) References Cited

FOREIGN PATENT DOCUMENTS

| | | |
|---|---|---|
| EP | 0 360 611 A2 | 3/1990 |
| EP | 0 376 616 B1 | 7/1990 |
| EP | 0 410 301 A1 | 1/1991 |
| EP | 0 449 466 A1 | 10/1991 |
| EP | 0 469 435 A1 | 2/1992 |
| EP | 0 508 054 A2 | 10/1992 |
| EP | 0 509 282 A2 | 10/1992 |
| EP | 0 532 963 A2 | 3/1993 |
| EP | 0 550 314 A1 | 7/1993 |
| EP | 0 550 315 A1 | 7/1993 |
| EP | 0 659 534 A2 | 6/1995 |
| EP | 0 693 515 A1 | 1/1996 |
| EP | 0 699 708 A2 | 3/1996 |
| EP | 0 725 101 A1 | 8/1996 |
| EP | 0 792 912 A2 | 9/1997 |
| EP | 0 796 886 A2 | 9/1997 |
| EP | 0 818 491 A2 | 1/1998 |
| EP | 0 725 100 B1 | 3/1998 |
| EP | 0 837 087 A1 | 4/1998 |
| EP | 0 839 862 A1 | 5/1998 |
| EP | 0 976 774 A2 | 2/2000 |
| EP | 0 771 846 B1 | 1/2002 |
| EP | 1 339 096 A2 | 8/2003 |
| EP | 1 369 447 A1 | 12/2003 |
| EP | 1 475 403 A1 | 11/2004 |
| EP | 1 548 059 A1 | 6/2005 |
| EP | 1 630 590 A1 | 3/2006 |
| EP | 1 712 581 A1 | 10/2006 |
| EP | 1 752 492 A1 | 2/2007 |
| EP | 1 845 123 A1 | 10/2007 |
| EP | 1 942 296 A1 | 7/2008 |
| EP | 1 972 659 A1 | 9/2008 |
| EP | 2 060 596 A1 | 5/2009 |
| EP | 2 060 607 A1 | 5/2009 |
| EP | 2 082 861 A1 | 7/2009 |
| EP | 1 474 459 B1 | 11/2009 |
| EP | 2 365 033 A1 | 9/2011 |
| EP | 2 412 757 A1 | 2/2012 |
| EP | 2 535 365 A1 | 12/2012 |
| GB | 766927 A | 1/1957 |
| GB | 1 538 188 A | 1/1979 |
| GB | 1548431 | 7/1979 |
| JP | 54-071191 A | 6/1979 |
| JP | 61-200125 A | 9/1986 |
| JP | 63-023927 A | 2/1988 |
| JP | 02-302440 A | 12/1990 |
| JP | 03-050264 A | 3/1991 |
| JP | H05-043799 A | 2/1993 |
| JP | 05-125184 A | 5/1993 |
| JP | 06-511281 T | 12/1994 |
| JP | H07-304948 A | 11/1995 |
| JP | 08-239469 A | 8/1996 |
| JP | 08-259808 A | 10/1996 |
| JP | 09-078351 A | 3/1997 |
| JP | 10-168183 A | 6/1998 |
| JP | 10-219026 A | 8/1998 |
| JP | 2000-204239 A | 7/2000 |
| JP | 2001-261973 A | 9/2001 |
| JP | 2004-083858 A | 3/2004 |
| JP | 2006-045390 A | 2/2006 |
| JP | 2009-132908 A | 6/2009 |
| JP | 2009-149896 A | 7/2009 |
| WO | WO 90/02017 A1 | 3/1990 |
| WO | WO 92/01389 A1 | 2/1992 |
| WO | WO 92/10525 A1 | 6/1992 |
| WO | WO 94/29367 A1 | 12/1994 |
| WO | WO 95/01389 A1 | 1/1995 |
| WO | WO 97/39053 A1 | 10/1997 |
| WO | WO 99/02606 A1 | 1/1999 |
| WO | WO 01/21698 A1 | 3/2001 |
| WO | WO 02/28953 A1 | 4/2002 |
| WO | WO 02/090421 A2 | 11/2002 |
| WO | WO 2004/055084 A2 | 7/2004 |
| WO | WO 2004/078848 A1 | 9/2004 |
| WO | WO 2004/090036 A1 | 10/2004 |
| WO | WO 2005/007727 A1 | 1/2005 |
| WO | WO 2005/035664 A1 | 4/2005 |
| WO | WO 2006/074934 A1 | 7/2006 |
| WO | WO 2006/122602 A1 | 11/2006 |
| WO | WO 2007/080754 A1 | 7/2007 |
| WO | WO 2007/087896 A1 | 8/2007 |
| WO | WO 2009/062692 A2 | 5/2009 |
| WO | WO 2009/095440 A1 | 8/2009 |
| WO | WO 2009/156323 A2 | 12/2009 |
| WO | WO 2012/168442 A1 | 12/2012 |
| WO | WO 2013/163012 A1 | 10/2013 |
| WO | WO 2013/188302 A1 | 12/2013 |
| WO | WO 2013/188323 A1 | 12/2013 |
| WO | WO 2013/188488 A1 | 12/2013 |

OTHER PUBLICATIONS

"BIAX, ein neuer Prüfkörper" (BIAX, a new inspection piece), published in Noss'Ovra staff magazine, Dec. 2006, No. 12, 29th year, EMS-Chemie AG (4 pgs.).

Cramer et al., "Some Isomorphous Copolyamides," *Journal of Polymer Science*, vol. 21, pp. 237-250 (1956).

Dolden, "Structure-property relationships in amorphous polyamides," *Polymer*, vol. 17, pp. 875-892 (1976).

Edgar et al., "The p-Phenylene Linkage in Linear High Polymers: Some Structure-Property Relationships," *Journal of Polymer Science*, vol. 8, No. 1, pp. 1-22 (1952).

Henkel Corporation, "Empol Dimer and Polybasic Acids: Technical Bulletin 114C," (1997).

Laura et al., "Effect of rubber particle size and rubber type on the mechanical properties of glass fiber reinforced, rubber-toughened nylon 6," *Polymer*, vol. 44, No. 11, pp. 3347-3361 (2003).

Levine et al., "Isomorphous Replacement in a Copolyamide System," *Journal of Polymer Science*, Issue XLIX, pp. 241-246 (1961).

Unichema International, "Pripol C36-Dimer Acid," (published prior to Dec. 17, 2003—exact date unknown).

Yu et al., "Isomorphous Replacement in a Copolyamide System: Homologs of Adipic and Terephthalic Acids," *Am. Chem. Soc.*, Issue 81, pp. 5361-5365 (1959).

State Intellectual Property Office of People's Republic of China, Notification of the First Office Action in Chinese Patent Application No. 201310356855.3 (dated Jun. 12, 2015).

State Intellectual Property Office of People's Republic of China, Notification of the Second Office Action in Chinese Patent Application No. 201310356855.3 (dated Feb. 5, 2016).

U.S. Appl. No. 10/536,494, filed Oct. 5, 2006.
U.S. Appl. No. 10/553,259, filed Jul. 24, 2006.
U.S. Appl. No. 11/950,964, filed Dec. 5, 2007.
U.S. Appl. No. 12/743,097, filed May 14, 2010.
U.S. Appl. No. 13/045,682, filed Mar. 11, 2011.
U.S. Appl. No. 13/186,785, filed Jul. 20, 2011.
U.S. Appl. No. 13/421,541, filed Mar. 15, 2012.
U.S. Appl. No. 13/481,451, filed May 25, 2012.
U.S. Appl. No. 13/800,102, filed Mar. 13, 2013.
U.S. Appl. No. 13/898,099, filed May 20, 2013.
U.S. Appl. No. 14/205,667, filed Mar. 12, 2014.
U.S. Appl. No. 14/607,676, filed Jan. 28, 2015.
U.S. Appl. No. 14/663,105, filed Mar. 19, 2015.
U.S. Appl. No. 14/681,669, filed Apr. 8, 2015.
U.S. Appl. No. 14/729,277, filed Jun. 3, 2015.
U.S. Appl. No. 14/915,031, filed Feb. 26, 2016.
Indian Patent Office, First Examination Report in Indian Patent Application No. 1599/DEL/2013 (dated Sep. 26, 2017).
U.S. Appl. No. 14/740,736, filed Jun. 16, 2015.
U.S. Appl. No. 14/935,642, filed Nov. 9, 2015.
U.S. Appl. No. 15/105,011, filed Sep. 6, 2016.
U.S. Appl. No. 15/253,506, filed Aug. 31, 2016.
U.S. Appl. No. 15/285,947, filed Oct. 5, 2016.
U.S. Appl. No. 15/385,432, filed Dec. 20, 2016.
U.S. Appl. No. 15/385,519, filed Dec. 20, 2016.
U.S. Appl. No. 15/546,373, filed Jul. 26, 2017.
U.S. Appl. No. 15/789,069, filed Oct. 20, 2017.

(56) References Cited

OTHER PUBLICATIONS

Japanese Patent Office, Notification of Reasons for Refusal in Japanese Patent Application No. 2013-164027 (dated Oct. 17, 2014).

* cited by examiner

POLYAMIDE MOLDING MATERIAL AND MOLDINGS MANUFACTURED FROM SAME

CROSS-REFERENCE TO A RELATED APPLICATION

This application claims the benefit of European Patent Application No. 12 197 634.4, filed Dec. 18, 2012, the disclosure of which is incorporated herein by reference.

BACKGROUND OF THE INVENTION

The present invention relates to heat-aging resistant polyamide molding materials based on partially crystalline, partially aromatic polyamides as well as to moldings manufactured therefrom.

Thermoplastic polyamides are frequently used in the form of glass-fiber reinforced molding materials as construction materials for components which are exposed to elevated temperatures during their service lives, with thermo-oxidative damage arising. The occurrence of thermo-oxidative damage can admittedly be delayed by the addition of known heat stabilizers, but cannot be permanently prevented, which is expressed e.g. in a drop in the mechanical parameters.

In addition to the heat-aging resistance, the temperatures in use which are caused by the melting points and the glass transition temperatures also play an important role in practice for the use of these polyamide molding materials.

US 2009/0127740 A1 describes a method of manufacturing a component comprising at least two parts which are bonded to one another, with at least one part being formed from a blend of partially aromatic polyamide and aliphatic polyamide. In this respect, in the most preferred variant, 65 to 95% by weight of partially aromatic polyamide (A) is mixed with 5 to 35% by weight of aliphatic polyamide (B) to improve the adhesion of parts which are molded thermoplastically on one another and are manufactured based on partially aromatic polyamide molding materials. The purely aliphatic polyamide (B) is always a component of the molding materials; and the teaching advises against blends of partially aromatic molding materials. No reports have been made on good heat stability or elevated melting points and glass transition temperatures of these molding materials.

To improve the processing capability of partially aromatic polyamides of the PA9T type, US2003/0023008 A1 proposes admixing specific aliphatic polyamides having a carbon/amide ratio of 7 to 12 in a concentration of 10 to 50% by weight. The glass temperature and the crystallization temperature of PA9T should be able to be lowered considerably by this measure while maintaining the melting temperature so that lower mold temperatures and a conventional heating of the injection molds are made possible.

BRIEF SUMMARY OF THE INVENTION

It is therefore the object of the present invention to provide polyamide molding materials based on partially crystalline, partially aromatic polyamides from which components can preferably be manufactured for the automotive sector and for the electrical/electronic sector which are in particular characterized by a glass transition temperature elevated with respect to the molding materials of the prior art and by an elevated melting point with comparatively good heat-aging resistance.

This object is achieved by polyamide molding materials comprising the following composition:

(A) 27 to 84.99% by weight of a polyamide mixture comprising
  (A1) at least one partially aromatic, partially crystalline polyamide differing from copolyamide 6.T/6 having a melting point in the range from 255 to 330° C.;
  (A2) at least one copolyamide 6.T/6 having a content of caprolactam of at least 30% by weight,
  wherein the total caprolactam content, i.e. the sum of the caprolactam contained in polyamide (A1) and copolyamide (A2), amounts to 3 to 30% by weight with reference to the polyamide mixture;
(B) 15 to 65% by weight of at least one filling and strengthening agent;
(C) 0.01 to 3.0% by weight of at least one heat stabilizer;
(D) 0 to 5.0% by weight of at least one additive,
wherein the components (A) to (D) amount to 100% by weight, and wherein no metal salts and/or metal oxides of a transition metal of the group VB, VIB, VIIB or VIIIB of the periodic system are added to the polyamide molding material.

DETAILED DESCRIPTION OF THE INVENTION

The molding materials in accordance with the invention are surprisingly characterized by high melting points and glass transition temperatures which make a use at higher temperatures possible. At the same time, the molding materials in accordance with the invention only soften at high temperatures.

The molding materials in accordance with the invention thus also have a storage modulus of >1000 MPa at temperatures of at least 93° C., preferably of at least 98° C., and particularly preferably of at least 105° C.

In addition, the molding materials in accordance with the invention have comparatively good heat-aging properties like the molding materials from the prior art at temperatures of at least 180° C., in particular at temperatures of more than 200° C., and have a heat deflection temperature (HDT A) of at least 220° C., preferably of at least 240° C.

In accordance with the invention, a partially aromatic, and simultaneously partially crystalline, polyamide having a melting point in the range from 255 to 330° C. is used as the component (A1) of the polyamide mixture or polyamide matrix (A). The melting point of polyamides in this respect essentially depends only with limitations on the molecular weight or on the intrinsic viscosity of the polyamides; but is rather caused by the chemical composition by the choice of the corresponding monomers. The polyamides which can be used for the invention can thus vary over a wide range, provided that their melting point lies in the previously named range. The melting points for the respective partially aromatic and partially crystalline polyamides are tabularized standard parameters for the respective polyamides, but can also be understood using simple trials.

A copolyamide 6.T/6 is to be understood as a polyamide which can be manufactured by copolymerization/copolycondensation of caprolactam with hexamethylene diamine and terephthalic acid. The caprolactam portion in the copolyamide 6.T/6 amounts, in the sense of the present invention, to at least 30 mol %, preferably at least 50 mol %, and particularly preferably at least 60 mol %. The caprolactam portion in the copolyamide 6.T/6 in contrast amounts to at most 90%, preferably at most 80%.

A copolyamide 6.T/6 is added to the partially crystalline, partially aromatic polyamide (A1) so that the caprolactam content of the polyamide matrix preferably amounts to 3 to 21.9% by weight, preferably 5 to 20% by weight, and particularly preferably 7 to 18% by weight. The glass transition temperatures and the melting points are lowered too much by concentrations of caprolactam which are too high.

The polyamide molding materials in accordance with the invention contain 27 to 84.99% by weight of a polyamide matrix, preferably 30 to 79.9% by weight, particularly preferably 35 to 70% by weight, comprising partially crystalline, partially aromatic polyamides (A1) different from copolyamide 6.T/6 and having a melting point from 255 to 330° C. and copolyamides 6.T/6 (A2).

The molding material in accordance with the invention is preferably free of polyolefins, in particular free of polyethylene-α-olefin copolymers.

The component (A1) comprises partially crystalline, partially aromatic polyamides which preferably have a glass transition temperature in the range from 90 to 140° C., preferably in the range from 110 to 140° C., and in particular in the range from 115 to 135° C.

The melting point of the polyamide (A1) lies in the range from 255 to 330° C., preferably in the range from 270 to 325° C., and in particular in the range from 280 to 320° C.

Preferred partially aromatic, partially crystalline polyamides are in this respect prepared from a) 30 to 100 mol %, in particular 50 to 100 mol %, terephthalic acid and/or naphthalene dicarboxylic acid as well as 0 to 70 mol %, in particular 0 to 50 mol % of at least one aliphatic dicarboxylic acid having 6 to 12 carbon atoms and/or 0 to 70 mol %, in particular 0 to 50 mol %, of at least one cycloaliphatic dicarboxylic acid having 8 to 20 carbon atoms, and/or 0 to 50 mol % isophthalic acid, with respect to the total quantity of the dicarboxylic acids.

b) 80 to 100 mol % of at least one aliphatic diamine having 4 to 18 carbon atoms, preferably having 6 to 12 carbon atoms, as well as 0 to 20 mol % of at least one cycloaliphatic diamine, preferably having 6 to 20 carbon atoms, and/or 0 to 20 mol % of at least one araliphatic diamine such as PACM, MACM, IPDA, MXDA and PXDA, with respect to the total quantity of the diamines, as well as, optionally, c) amino carboxylic acids and/or lactams each having 6 to 12 carbon atoms.

In accordance with a preferred embodiment, the partially aromatic polyamide of component (A1) is in this respect formed based on at least 30 mol %, in particular on at least 50 mol %, terephthalic acid and at least 80 mol % aliphatic diamines having 4 to 18 carbon atoms, preferably having 6 to 12 carbon atoms, and optionally further aliphatic, cycloaliphatic and aromatic dicarboxylic acids as well as lactams and/or aminocarboxylic acids. In addition to the terephthalic acid, isophthalic acid and naphthalene dicarboxylic acid can be used as further aromatic dicarboxylic acids. Suitable aliphatic and cycloaliphatic dicarboxylic acids which can be used in addition to terephthalic acid have 6 to 36 carbon atoms and are used in a proportion of at most 70 mol %, in particular in a proportion of at most 50 mol %, with respect to the total quantity of the dicarboxylic acids.

It is moreover preferred that the named aromatic dicarboxylic acids of the partially aromatic polyamides of component (A1) are selected from the group: terephthalic acid, isophthalic acid as well as mixtures thereof.

In accordance with a further preferred embodiment, the named e.g. aliphatic dicarboxylic acids of the partially aromatic polyamide of component (A1) which can be used in addition to terephthalic acid are selected from the group of adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid and dimer fatty acid (C36). The acids preferred from the dicarboxylic acids are adipic acid, sebacic acid, dodecanedioic acid, isophthalic acid or a mixture of such dicarboxylic acids, particularly adipic acid and isophthalic acid and particularly adipic acid alone.

In accordance with a further preferred embodiment, the named aliphatic diamines of the partially aromatic polyamide of component (A1) are selected from the group of 1,4-butanediamine, 1,5-pentanediamine, 1,6-hexanediamine, 1,7-heptanediamine, 1,8-octanediamine, 1,9-nonanediamine, methyl 1,8-octanediamine, 1,10-decanediamine, 1,11-undecanediamine, 1,12-dodecane diamine or a mixture of such diamines, with 1,6-hexanediamine, 1,10-decanediamine, 1,12-dodecanediamine or a mixture of such diamines being preferred, with 1,6-hexanediamine and 1,10-decanediamine being particularly preferred. In addition to the aliphatic diamines, cycloaliphatic and/or araliphatic diamines can be replaced in a concentration of 0 to 20 mol %, with respect to the total quantity of diamines.

The refractory polyamides are particularly preferably formed from the following components:
a) (A1a) Dicarboxylic acids:
50 to 100 mol % aromatic terephthalic acid and/or naphthalene dicarboxylic acid, with respect to the total content of present dicarboxylic acids;
0 to 50 mol % of an aliphatic dicarboxylic acid, preferably having 6 to 12 carbon atoms, and/or of a cycloaliphatic dicarboxylic acid having preferably 8 to 20 carbon atoms, and/or isophthalic acid;
b) (A1b) Diamines:
80 to 100 mol % of at least one aliphatic diamine having 4 to 18 carbon atoms, preferably having 6 to 12 carbon atoms, with respect to the total content of present diamines,
0 to 20 mol % cycloaliphatic diamines, preferably having 6 to 20 carbon atoms, and/or araliphatic diamines, such as PACM, MACM, IPDA, MXDA and PXDA, wherein the percentage mol content of dicarboxylic acids makes up 100% and the percentage mol content of diamines makes up 100% in the refractory polyamides, and optionally from:
c) (A1c) Aminocarboxylic acids and/or lactams, comprising lactams having preferably 6 to 12 carbon atoms, and/or aminocarboxylic acids having preferably 6 to 12 carbon atoms.

While the components (A1a) and (A1b) are largely used equimolar, the concentration of (A1c) amounts to at most 20% by weight, preferably at most 15% by weight, in particular at most 12% by weight, in each case with respect to the sum of (A1a) to (A1c).

In addition to the components (A1a) and (A1b), which are largely used equimolar, dicarboxylic acids (A1a) or diamines (A1b) can be used for regulating the molar mass or for compensating monomer losses in polyamide manufacture so that the concentration of a component (A1a) or (A1b) can predominate in their totality.

Suitable cycloaliphatic dicarboxylic acids are the cis- and/or trans-cyclohexane-1,4-dicarboxylic acid and/or cis- and/or trans-cyclohexane-1,3-dicarboxylic acid (CHDA).

The above-named aliphatic diamines which are used as obligatory can be replaced by other diamines in a subordinate quantity of no more than 20 mol %, of preferably no more than 15 mol %, and in particular of no more than 10 mol %, with respect to the total quantity of diamines. Cyclohexanediamine, 1,3-Bis-(aminomethyl)-cyclohexane (BAC), isophorone diamine, norbornane dimethylamine, 4,4'-diaminodicyclohexylmethane (PACM), 2,2-(4,4'-diaminodicyclohexyl)propane (PACP) and 3,3'-dimethyl-4,4'-diamino-dicyclohexylmethane (MACM) can be used, for example, as cycloaliphatic diamines. m-xylylenediamine (MXDA) and p-xylylenediamine (PXDA) can be named as araliphatic diamines.

In addition to the described dicarboxylic acids and diamines, lactams and/or aminocarboxylic acids can be used as polyamide-forming components (component (A1c)). Suitable compounds are, for example, caprolactam (CL), α,ω-aminocaproic acid, α,ω-aminononanoic acid, α,ω-aminoundecane acid (AUA), laurolactam (LL) and α,ω-aminododecane acid (ADA). The concentration of the aminocarboxylic acids and/or lactams used together with the components (A1a) and (A1b) amounts to at most 20% by weight, preferably at most 15% by weight, and particularly preferably at most 12% by weight, with respect to the sum of the components (A1a) to (A1c). Lactams or α,ω-amino-acids having 4, 6, 7, 8, 11 or 12 C atoms are especially preferred. These are the lactams pyrrolidine-2-one (4 C atoms) ε-caprolactam (6 C atoms), enantholactam (7 C atoms), capryllactam (8 C atoms), laurolactam (12 C atoms) or the α,ω-aminoacids 1,4-aminobutanoic acid, 1,6-aminohexanoic acid, 1,7-aminoheptanoic acid, 1,8-aminooctanoic acid, 1,11-aminoundecanoic acid and 1,12-aminododecanoic acid. In a particularly preferred embodiment, the A1 component is free of caprolactam or of aminocaproic acid.

Regulators in the form of monocarboxylic acids or monoamines can be added to the preparation and/or to the precondensate (prior to postcondensation) to regulate the molecular weight, the relative viscosity or the flowability or of the MVR. Aliphatic, cycloaliphatic or aromatic monocarboxylic acids or monoamines suitable as regulators are acetic acid, propionic acid, butyric acid, valerianic acid, caproic acid, lauric acid, stearic acid, 2-ethylhexanoic acid, cyclohexanoic acid, benzoic acid, 3-(3,5-di-tert-butyl-4-hydroxyphenyl)propanoic acid, 3,5-di-tert-butyl-4-hydroxybenzoic acid, 3-(3-tert-butyl-4-hydroxy-5-methylphenyl) propanoic acid, 2-(3,5-di-tert-butyl-4-hydroxybenzylthio) acetic acid, 3,3-bis(3-tert-butyl-4-hydroxy-phenyl)butyric acid, butylamine, pentylamine, hexylamine, 2-ethylhexylamine, n-octylamine, n-dodecylamine, n-tetradecylamine, n-hexadecylamine, stearylamine, cyclohexylamine, 3-(cyclohexylamino)-propylamine, methylcyclohexylamine, dimethylcyclohexylamine, benzylamine, 2-phenylethylamine, 2,2,6,6-tetramethylpiperidine-4-amine, 1,2,2,6,6-pentamethylpiperidine-4-amine, 4-amino-2,6-di-tert-butylphenol, etc. The regulators can be used individually or in combination. Other monofunctional compounds can also be used as regulators which can react with an amino group or with an acid group, such as anhydrides, isocyanates, acid halides or esters. The usual usage quantity of the regulators lies between 10 and 200 mmol per kg polymer.

The partially aromatic copolyamides (A1) can be prepared using processes known per se. Suitable processes have been described in different documents and in the following some of the possible processes discussed in patent literature should be presented; the disclosure content of the documents named in the following is explicitly included in the disclosure content of the present application with respect to the process for preparing the copolyamide of component (A): DE-A-195 13 940, EP-A-0 976 774, EP-A-0 129 195, EP-A-0 129 196, EP-A-0 299 444, U.S. Pat. No. 4,831,106, U.S. Pat. No. 4,607,073, DE-A-14 95 393 and U.S. Pat. No. 3,454,536.

Specific representatives for the polyamides (A1) in accordance with the invention are: PA 4T/4I, PA 4T/6I, PA 5T/5I, PA 6T/6I, PA 6T/6I/6, PA 6I/66, 6T/610, 6T/612, PA 6T/10T, PA 6T/10I, PA 9T, PA 10T, PA 12T, PA 10T/10I, PA10T/106, PA10T/12, PA10T/11, PA 6T/9T, PA 6T/12T, PA 6T/10T/6I, PA 6T/6I/6, PA 6T/6I/12 as well as mixtures thereof; particularly preferably the partially aromatic polyamide of component (A) is selected from the group: PA 6T/6I, PA 6T/66, PA 6T/10T, PA 6T/10T/6I, as well as mixtures thereof. Polyamides (A1) which contain 6T units, in particular at least 10% by weight of 6T units, are preferred.

In accordance with the invention, in particular the following partially aromatic copolyamides are therefore preferred as refractory polyamides (A1):

partially crystalline polyamide 6T/6I having 50 to 80 mol % hexamethyleneterephthalamide units and 20 to 50 mol % hexamethyleneisophthalamide units;

partially crystalline polyamide 6T/6I having 55 to 75 mol % hexamethyleneterephthalamide units and 25 to 45 mol % hexamethyleneisophthalamide units;

partially crystalline polyamide 6T/6I having 62 to 73 mol % hexamethyleneterephthalamide units and 25 to 38 mol % hexamethyleneisophthalamide units;

partially crystalline polyamide 6T/6I having 70 mol % hexamethyleneterephthalamide units and 30 mol % hexamethyleneisophthalamide units;

partially crystalline polyamide 6T/66 having 30 to 80 mol % hexamethyleneterephthalamide units and 20 to 70 mol % hexamethyleneadipamide units partially crystalline polyamide 6T/66 having 50 to 70 mol % hexamethyleneterephthalamide units and 30 to 50 mol % hexamethyleneadipamide units;

partially crystalline polyamide 6T/66 having 50 to 60 mol % hexamethyleneterephthalamide units and 40 to 50 mol % hexamethyleneadipamide units;

partially crystalline polyamide 6T/66 having 55 to 60 mol % hexamethyleneterephthalamide units and 40 to 45 mol % hexamethyleneadipamide units;

partially crystalline polyamide, prepared from at least 50 mol % terephthalic acid and at most 50 mol % isophthalic acid as well as a mixture of at least two diamines, selected from the group of hexamethylenediamine, nonanediamine, methyloctanediamine und decanediamine;

partially crystalline polyamide, prepared from at least 70 mol % terephthalic acid and at most 30 mol % isophthalic acid as well as a mixture of hexamethylenediamine and dodecanediamine;

partially crystalline polyamide, prepared from at least 50 mol % terephthalic acid and at most 50 mol % dodecanedioic acid as well as a mixture of at least two diamines, selected from the group of hexamethylenediamine, nonanediamine, methyloctanediamine und decanediamine;

partially crystalline polyamide 6T/10T having 10 to 60 mol %, preferably 10 to 40 mol % hexamethyleneterephthalamide (6T) units and 40 to 90 mol %, preferably 60 to 90 mol % decamethyleneterephthalamide (10T) units;

partially crystalline polyamide 6T/10T/6I having 50 to 90 mol %, preferably 50 to 70 mol %, hexamethylene terephthalamide (6T) units and 5 to 45 mol %, preferably 10 to 30 mol % hexamethyleneisophthalamide (6I) units and 5 to 45 mol %, preferably 2 to 40 mol %, decamethyleneterephthalamide (10T) units;

partially crystalline polyamide 6T/6I/6 having 60 to 85 mol % hexamethylene terephthalamide (6T) units and 15 to 40 mol % hexamethyleneisophthalamide (6I) units which additionally contains 5 to 15% by weight caprolactam.

The partially aromatic, partially crystalline polyamide (A1) has a solution viscosity $\eta_{rel}$, measured as per DIN EN ISO 307 on solutions of 0.5 g polymer in 100 ml m-cresol at a temperature of 20° C., of at most 2.6, preferably of at most 2.3, in particular of at most 2.0. Polyamides (A1) having a solution viscosity $\eta_{rel}$ in the range of 1.45 to 2.3, in particular in the range from 1.5 to 2.0 or from 1.5 to 1.8 are preferred.

The polyamides (A1) in accordance with the invention can be manufactured in usual polycondensation plants over the process sequence precondensate and postcondensation. The described chain regulators are preferably used for the regulation of the viscosity for the polycondensation. In addition, the viscosity can be set by the use of a diamine excess or a diacid excess.

The component (A2) is represented by copolyamides 6.T/6 having a content of caprolactam of at least 30% by weight, preferably of at least 50% by weight, and particularly preferably of at least 60% by weight.

The copolyamide (A2) has a solution viscosity $\eta_{rel}$, measured as per DIN EN ISO 307 on solutions of 0.5 g polymer dissolved in 100 ml m-cresol at a temperature of 20° C., in the range from 1.5 to 3.0, preferably in the range from 1.6 to 2.5, in particular in the range from 1.8 to 2.2.

In accordance with a further preferred embodiment of the proposed polyamide molding material, the filling and strengthening agents of component (B) are fibers, in particular glass fibers and/or carbon fibers, with preferably short fibers, preferably having a length in the range from 2 to 50 mm and a diameter of 5 to 40 μm and/or endless fibers (rovings) being used and with in particular fibers having a circular and/or non-circular cross-sectional area being used, with in the latter case the dimension ratio of the main cross-sectional axis to the secondary cross-sectional axis being in particular >2, preferably lying in the range from 2 to 8, and particularly preferably in the range from 3 to 5.

In this respect, glass fibers having a non-circular cross-sectional area and a dimension ratio of the main cross-sectional axis to the secondary cross-sectional axis are used of more than 2, preferably from 2 to 8, in particular from 3 to 5. These so-called flat glass fibers have an oval cross-sectional area, an elliptical cross-sectional area, an elliptical cross-sectional area provided with constriction(s) (so-called "cocoon" fibers), or a rectangular or almost rectangular cross-sectional area.

The flat glass fibers in accordance with the invention having a non-circular cross-sectional area are preferably used as short glass fibers (chopped glass having a length of 0.2 to 20 mm, preferably from 2 to 12 mm).

A further preferred feature of the flat glass fibers used is that the length of the main cross-sectional axis preferably lies in the range from 6 to 40 μm, in particular in the range from 15 to 30 μm, and the length of the secondary cross-sectional axis lies in the range from 3 to 20 μm, in particular in the range from 4 to 10 μm.

To reinforce the molding materials in accordance with the invention, mixtures of glass fibers having circular and non-circular cross-sections can also be used, with the proportion of flat glass fibers as defined above preferably predominating, i.e. making up more than 50% by weight of the total mass of the fibers.

If reinforced molding materials having good flowability and a good surface quality are the aim, in particular in combination with flame-retardants, the reinforcing fibers preferably comprise predominantly (i.e., e.g. more than 80% by weight or even more than 90% by weight) flat glass fibers or even only flat glass fibers.

The glass fibers used in accordance with the invention as rovings (filler component (B)) have a diameter of 10 to 20 μm, preferably of 12 to 18 μm, with the cross-section of the glass fibers being able to be round, oval, elliptical, almost rectangular or rectangular. So-called flat glass fibers having a ratio of the cross-sectional axes of 2 to 5 are particularly preferable. E-glass fibers are in particular used in accordance with the invention. However, all other glass fiber types can also be used, such as A, C, D, M, S, R glass fibers or any desired mixtures thereof or mixtures with E-glass fibers.

With long-fiber reinforced molding materials, higher toughness values and thus properties even more similar to metal result if, instead of the usual endless glass fiber having a diameter of 15 to 19 μm, those are used having a diameter from 10 to 14 μm, in particular those having a diameter from 10 to 12 μm.

The polyamide molding materials in accordance with the invention can be prepared by the known methods for manufacturing long-fiber reinforced rod-like granules, in particular by pultrusion processes in which the endless fiber strand (roving) is completely saturated with the polymer melt and is subsequently cooled and cut.

The long-fiber reinforced rod-like granules obtained in this manner, which preferably have a granular length of 3 to 25 mm, in particular from 4 to 12 mm, can be further processed using the customary processing methods such as injection molding or pressing, to form molded parts.

The endless carbon fibers used in the pultrusion process have a diameter from 5 to 10 μm, preferably from 6 to 8 μm. To improve the matrix bond and the fiber handling, the fibers can be coated with chemically different layers such as are known for glass fibers and carbon fibers in the prior art.

The glass fibers themselves can in this respect be selected, independently of the shape of the cross-sectional area and of the length of the fiber, from the group of E-glass fibers, A-glass fibers, C-glass fibers, D-glass fibers, M-glass fibers, S-glass fibers and/or R-glass fibers, with E-glass fibers being preferred.

The filling and strengthening agents of the component (B) can also be particle-like fillers or a mixture of fibers and particle-like fillers. In this respect, mineral fillers based on natural and/or synthetic phyllosilicates, talc, mica, silicate, quartz, titanium dioxide, wollastonite, kaolin, amorphous silicic acids, magnesium carbonate, magnesium hydroxide, chalk, lime, feldspar, barium sulfate, solid or hollow glass balls or ground glass, permanently magnetic or magnetizable metal compounds and/or alloys or mixtures respectively can preferably be used as particle-like fillers. The fillers can also be surface treated.

Kaolins, serpentines, talcum, mica, vermiculite, illite, smectite, montmorillonite, hectorite, double hydroxides or mixtures thereof can e.g. be used as phyllosilicates in the molding materials in accordance with the invention. The phyllosilicates can be surface treated, but can also be untreated.

The thermoplastic molding materials in accordance with the invention contain as component (C) 0.01 to 3% by weight, preferably 0.02 to 2% by weight, particularly preferably 0.1 to 1.5% by weight of at least one heat stabilizer.

In a preferred embodiment, the heat stabilizers are selected from the group comprising

- compounds of monovalent or divalent copper, e.g. salts of monovalent or divalent copper having inorganic or organic acids or monovalent or divalent phenols, the oxides of monovalent or divalent copper, or complex compounds of copper salts with ammonia, amines, amides, lactams, cyanides or phosphines, preferably Cu(I) salts or Cu(II) salts of halogen hydracids, hydrocyanic acids or copper salts of aliphatic carboxylic acids. The monovalent copper compounds are particularly preferably CuCl, CuBr, CuI, CuCN and $Cu_2O$ as well as the divalent copper compounds $CuCl_2$, $CuSO_4$, CuO, copper-(II)-acetate or copper-(II)-stearate. If a copper compound is used, the quantity of copper preferably amounts to 0.003 to 0.5, in particular 0.005 to 0.3, and particularly preferably 0.01 to 0.2% by weight, with respect to the sum of the components (A) to (D). The copper compounds are commercial or their manufacture is known to the skilled person. The copper compound can be used as such or in the form of concentrates. Concentrate is to be understood in this respect as a polymer, preferably of the same chemical nature as component (A1) or (A2) which contains the copper salt in a high concentration. The use of concentrates is a usual process and is used particularly frequently when very small quantities of a substance are to be metered. The copper compounds are advantageously used in combination with further metal halides, in particular alkali halides such as NaI, KI, NaBr, KBr, with the molar ratio of metal halide to copper halide amounting to 0.5 to 20, preferably 1 to 10, and particularly preferably 3 to 7.
- Stabilizers based on secondary aromatic amines, with these stabilizers preferably being present in a quantity of 0.2 to 2, preferably 0.2 to 1.5% by weight.
- Stabilizers based on sterically hindered phenols, with these stabilizers preferably being present in a quantity of 0.1 to 1.5, preferably 0.2 to 1% by weight
- Phosphites and phosphonites, as well as
- Mixtures of the above-named stabilizers.

Particularly preferred examples for stabilizers which can be used in accordance with the invention based on secondary aromatic amines are adducts of phenylene diamine with acetone (Naugard A), adducts of phenylene diamine with linolene, Naugard 445, N,N'-dinaphthyl-p-phenylene diamine, N-phenyl-N'-cyclohexyl-p-phenylene diamine or mixtures of two or more thereof.

Preferred examples for stabilizers in accordance with the invention based on sterically hindered phenols are N,N'-hexamethylene-bis-3-(3,5-di-tert-butyl-4-hydroxyphenyl)-propionamide, bis-(3,3-bis-(4'-hydroxy-3'-tert-butylphenyl)-butanic acid)-glycol ester, 2,1'-thioethyl-bis-(3-(3,5-di-tert-butyl-4-hydroxyphenyl)-propionate, 4-4'-butylidene-bis-(3-methyl-6-tert-butylphenol), triethyleneglycol-3-(3-tert-butyl-4-hydroxy-5-methylphenyl)-propionate or mixtures of two or more of these stabilizers.

Preferred phosphites and phosphonites are triphenylphosphite, diphenylalkylphosphite, phenyldialkylphosphite, tris(nonylphenyl)phosphite, trilaurylphosphite, trioctadecylphosphite, distearyl phentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,6-di-tert-butyl-4-methylphenyl)-pentaerythritol diphosphite, diisodecyloxy pentaerythritol diphosphite, bis(2,4-di-tert-butyl-6-methylphenyl)pentaerythritol diphosphite, bis(2,4,6-tris-(tert-butylphenyl)) pentaerythritol diphosphite, tristearylsorbitol triphosphite, tetrakis(2,4-di-tert-butylphenyl)-4,4'-biphenylene diphosphonite,6-lsooctyloxy-2,4,8,10-tetra-tert-butyl-12H-dibenz [d,g]-1,3,2-dioxaphosphocine, 6-fluoro-2,4,8,10-tetra-tert-butyl-12-methyl-dibenz[d,g]-1,3,2-dioxaphosphocine, bis (2,4-di-tert-butyl-6-methylphenyl)methylphosphite and bis (2,4-di-tert-butyl-6-methylphenyl)ethylphosphite. In particular, tris[2-tert-butyl-4-thio(2'-methyl-4'-hydroxy-5'-tert-butyl)-phenyl-5-methyl]phenyl phosphite and tris(2,4-di-tert-butylphenyl)phosphite (Hostanox® PAR24: commercial product of Clariant, Basel) are particularly preferred.

A preferred embodiment of the heat stabilizer is the combination of organic heat stabilizers (in particular Hostanox PAR 24 and Irganox 1010), a bisphenol A based epoxide (in particular Epikote 1001) and a copper stabilization based on CuI and KI. A commercially available stabilizer mixture comprising organic stabilizers and epoxies is, for example, Irgatec NC66 by BASF SE. A further commercially available stabilizer mixture is Recycloblend® 660 by BASF SE. A heat stabilization solely based on CuI and KI is particularly preferred. In addition to the addition of copper or copper compounds, the use of further transition metal compounds, in particular metal salts or metal oxides of the group VB, VIB, VIIB or VIIIB of the periodic system, are precluded.

Optionally, however, metallic additives such as additives of elemental metals of the groups VB, VIB, VIIB and/or VIIIB such as iron or steel powder etc. can be present or added to the polyamide molding material.

The molding materials in accordance with the invention can contain further additives (D) such as from the groups of light protective agents, UV stabilizers, UV absorbers or UV blockers, lubricants, colorings, nucleation agents, metal pigments, antistatic agents, conductivity additives, demolding agents, optical brighteners or mixtures of the named additives. Carbon black and/or carbon nanotubes can e.g. be used as antistatic agents in the molding materials in accordance with the invention. The use of carbon black can, however, also serve the improvement of the blackening of the molding material. The molding material can, however, also be free of metallic pigments.

The molding materials in accordance with the invention preferably have a break strength of more than 50%, preferably of more than 54%, and particularly preferably of more than 56%, with respect to the starting value prior to the heat aging, after 1000 hours of heat aging at 220° C.

The molding materials in accordance with the invention preferably have an elongation at break of more than 47%, preferably of more than 48%, and particularly preferably of more than 50%, with respect to the starting value prior to the heat aging, after 1000 hours of heat aging at 220° C.

The present invention furthermore relates to a method of manufacturing such polyamide molding materials. It also relates to moldings which are manufactured using such polyamide molding materials.

The invention additionally relates to uses of moldings which at least partially comprise such polyamide molding materials.

There can be named by way of example for the automotive sector: Cylinder head covers, engine covers, housings for air intercoolers, air intercooler valves, intake pipes, in particular intake manifolds, connectors, cogs, fan wheels, cooling water boxes, housings or housing parts for heat exchangers, coolant coolers, air intercoolers, thermostat, water pump, heaters, fastening parts. In the electrical/electronic sector, such uses are, for example, parts of circuit boards, housings, films, lines, switches, distributors, relays, resistors, capacitors, coils, lamps, diodes, LEDs, transistors, connectors, regulators, memories and sensors. Further embodiments are set forth herein.

The invention will be described in the following using specific embodiments and will be compared with the systems in accordance with the prior art. The embodiments set forth in the following and the FIGURE serve as a basis for the invention and to demonstrate the differences from the prior art; however, they should not be used to restrict the general subject matter of the invention.

Manufacture of the Molding Materials and Compounds

The molding materials for the examples B1 to B4 in accordance with the invention and for the comparison examples VB1 to VB5 were manufactured on a twin shaft extruder of the company Werner and Pfleiderer, Type ZSK25. The quantity proportions of the starting materials set forth in Table 2 in percent by weight (% by weight), with respect to 100% by weight of the total molding material, were compounded in the twin-shaft extruder. The polyamide granules together with the additives were metered into the entry zone while the glass fibers were metered into the polymer melt via side feeder 3 housing units before the nozzle. The housing temperature was set as an increasing profile up to 330° C. 10 kg throughput was reached at 150 to 200 r.p.m. After cooling the strands in the water bath, granulation and drying at 120° C. for 24 hours, the injection of compounds to ISO test specimens took place. Injection took place on an injection molding machine Arburg Allrounder 320-210-750 at cylinder temperatures of 325° C. to 340° C. of zones 1 to 4 and at a tool temperature of 130° C.

The materials listed in Table 1 were used in the examples and in the comparison examples.

TABLE 1

Materials used

| Material | Trade name | Supplier | Rel. viscosity[a] | $H_2O$-content [% by weight] |
|---|---|---|---|---|
| PA 6T/6I/6 (70:18:12 mol %) | — | EMS-CHEMIE AG (CH) | 1.72[a] | 0.01 |
| PA 6T/66 (55:45 mol %)[e] | — | EMS-CHEMIE AG (CH) | 1.60[a] | 0.06 |
| PA 6T/6A (25:75 mol %) | — | EMS-CHEMIE AG (CH) | 1.80[a] | 0.03 |
| PA 6T/6B (50:50 mol %) | — | EMS-CHEMIE AG (CH) | 1.90[a] | 0.03 |
| PA 6T/6 C (60:40 mol %) | — | EMS-CHEMIE AG (CH) | 1.60[a] | 0.04 |
| PA 6 A | Grilon A28 | EMS-CHEMIE AG (CH) | 2.10[b] | 0.02 |
| PA 6 B | Grilon F47 | EMS-CHEMIE AG (CH) | 3.10[b] | 0.02 |
| Ca-stearate | Ligastar CA 80 | Greven (DE) | — | — |
| KI/Ca-stearate (ratio 98:2) | — | AJAY Europe S.A.R.L. (FR)[c] | — | — |
| Copper iodide | — | William Blythe (UK) | — | — |
| Stabilizer mixture | Recycloblend ® 660 | BASF SE | — | — |
| Kaolin | — | Imerys Performance & Filtration Minerals (UK) | — | — |
| Stabilizer 1 | Doverphos S-9228 | Dover Chemical Corp. (US) | — | — |
| Black master batch | MB PA66 W9296[d] | — | — | — |
| Glass fiber 1 | Vetrotrex 995 EC10-4.5 | OCV (FR) | — | — |
| Glass fiber 2 | Chopvantage HP 3660 | PPG (NL) | — | — |

[a]Determined in accordance with ISO 307 (0.5 g polyamide in 100 ml m-cresol), calculation of the relative viscosity (RV) according to RV = $t/t_0$ based on Section 11 of the Standard;
[b]Determined in accordance with ISO 307 (0.5 g polyamide in 100 ml formic acid), calculation of the relative viscosity (RV) according to RV = $t/t_0$ based on Section 11 of the Standard
[c]Supplier of KI, mixing of Ca-stearate takes place at EMS:
[d]Master batch manufactured from 75% by weight PA66 at an RV of 2.8 (determined in accordance with ISO 307 with 0.5 g polyamide in 100 ml $H_2SO_4$) and 25% by weight carbon black, at EMS-CHEMIE AG,
[e]Smp. 310° C., Tg: 94° C.

TABLE 2

Compositions.

| | B1 | VB1 | VB2 | B2 | B3 | B4 | VB3 | VB4 |
|---|---|---|---|---|---|---|---|---|
| Composition | | | | | | | | |
| PA 6T/6I/6 | 61.8 | 46.0 | 67.775 | — | — | — | — | — |
| PA 6T/66 | — | — | — | 57.4 | 57.4 | 40.4 | 57.4 | 59.86 |
| PA 6T/6 A | 7.2 | 23.0 | — | 12.0 | — | — | — | — |
| PA 6T/6 B | — | — | — | — | — | — | — | — |
| PA 6T/6 C | — | — | — | — | 12.0 | 29.0 | — | — |
| PA 6 A | — | — | — | — | — | — | — | 9.0 |
| PA 6 B | — | — | — | — | — | — | 12.0 | — |
| Caprolactam proportion in comp. A and B with respect to the sum of components A and B [mol %] | 19 | 33 | 12 | 13 | 7 | 17 | 17 | 13 |
| KI/Ca-stearate (ratio 98:2) | 0.3 | 0.3 | 0.21 | 0.3 | 0.3 | 0.3 | 0.3 | 0.3 |
| Copper iodide | 0.035 | 0.035 | 0.035 | 0.035 | 0.035 | 0.035 | 0.035 | 0.04 |
| Stabilizer mixture | 0.4 | 0.4 | 0.5 | — | — | — | — | — |
| Stabilizer 1 | — | — | — | — | — | — | — | 0.5 |
| Kaolin | 0.265 | 0.265 | 0.28 | 0.265 | 0.265 | 0.265 | 0.265 | 0.3 |

TABLE 2-continued

| Compositions. | | | | | | | | |
|---|---|---|---|---|---|---|---|---|
| | B1 | VB1 | VB2 | B2 | B3 | B4 | VB3 | VB4 |
| Black master batch | — | — | 1.2 | — | — | — | — | — |
| Glass fiber 1 | 30.0 | 30.0 | — | 30.0 | 30.0 | 30.0 | 30.0 | 30.0 |
| Glass fiber 2 | — | — | 30.0 | — | — | — | — | — |
| Properties | | | | | | | | |
| Melting point [° C.] | 307 | 298 | 312 | 295 | 300 | 288 | 290 | 283 |
| Glass transition temperature [° C.] | 113 | 100 | 123 | 93 | 93 | 94 | 81 | 85 |
| HDT A (1.8 MPa) [° C.] | 241 | 210 | 265 | 259 | 261 | 242 | 256 | 251 |
| HDT C (8 MPa) [° C.] | 136 | 101 | 153 | 162 | 166 | 162 | 158 | 157 |

TABLE 3

| Mechanical properties after heat storage at 220° C. | | | | | | | | |
|---|---|---|---|---|---|---|---|---|
| | B1 | VB1 | VB2 | B2 | B3 | B4 | VB3 | VB4 |
| Mechanical properties (after 0 h) | | | | | | | | |
| Tensile modulus [MPa] | 10853 | 10704 | 10630 | 10363 | 10641 | 10512 | 10287 | 10416 |
| Break strength [MPa] | 203 | 196 | 195 | 203 | 209 | 200 | 201 | 206 |
| Elongation at break [%] | 2.3 | 2.3 | 2.3 | 2.8 | 2.6 | 2.5 | 2.8 | 2.8 |
| Mechanical properties (after 1000 h) at 220° C. | | | | | | | | |
| Tensile modulus [MPa] | 12823 | 12481 | 11867 | 11203 | 10915 | 11395 | 11186 | 11429 |
| Break strength [MPa] | 120 | 110 | 77 | 130 | 118 | 118 | 138 | 115 |
| Break strength with respect to the starting value [%] | 59 | 56 | 39 | 64 | 56 | 59 | 69 | 56 |
| Elongation at break [%] | 1.3 | 1.2 | 0.8 | 1.4 | 13 | 1.3 | 1.4 | 1.1 |
| Elongation at break with respect to the starting value [%] | 57 | 52 | 35 | 50 | 50 | 52 | 50 | 39 |

The determination of the properties set forth in Tables 2 to 3 and the determination of the storage modulus curves took place using the following methods.

Determination of the Glass Transition Temperature (Tg)

The differential scanning calorimetry (DSC) was carried out at a heating rate of 20° C./min. The temperature for the onset is given for the glass transition temperature (Tg). The determination of the glass transition temperature took place on a DSC 2920 (differential scanning calorimeter) of the company TA Instruments according to ISO Standard 11357 Parts 1+2. Nitrogen was used as the purge gas and indium ($Smp_{Onset}$: 156.6° C., ΔH: 28.45 J/g) as the calibration substance. 10 mg of the specimen was weighed into an aluminum crucible and the latter was closed. The sample was then first heated at 20° C./minute above the melting point of the specimen, i.e. at least 10° C. higher than the end of the melting process, and cooled isothermally to room temperature at 5° C./minute after one minute. Heating was subsequently again carried out at 20° C. per minute over the melting point and quenched in solid carbon dioxide to determine the glass transition temperature. The thermogram was evaluated using the Universal Analysis program.

Determination of the Melting Point

The determination of the melting point took place according to ISO Standard 11357-11-2, granules. The differential scanning calorimetry (DSC) was carried out at a heating rate of 20° C./min.

Determination of HDT A (1.8 MPa) and HDT C (8 MPa):

The determination of HDT A (1.8 MPa) and HDT C (8 MPa) took place according to ISO 75 on an ISO impact test piece having the dimensions 80×10×4 mm.

Carrying Out the Heat Storage

The heat storages were carried out in ventilated, electrically heated single-chamber heat cabinets in accordance with IEC 60216-4-1 at 180° C. or 230° C. at ISO tensile test pieces (Standard: ISO 3167, type A 170×20/10×4 mm). After the times set forth in Table 3, specimens were removed from the furnace and tested using the above methods after cooling to 23° C.

Determination of the Tensile Modulus

The determination of the tensile modulus took place according to ISO 527 at a tensile elongation speed of 1 mm/min on an ISO tensile test specimen according to the standard ISO 3167, Type A, having the dimensions 170×20/10×4 mm at a temperature of 23° C.

Determination of the Break Strength and of the Elongation at Break

The determination of the break strength and of the elongation at break took place according to ISO 527 at a tensile elongation speed of 5 mm/min on an ISO tensile test specimen according to the standard ISO 3167, Type A, having the dimensions 170×20/10×4 mm at a temperature of 23° C.

Determining the Storage Modulus Curves

The storage modulus curves were determined in accordance with ISO 6721 on a rheometer (Physica MCR 301 of Anton Paar GmbH) at test specimens of the dimension 60×10×1 mm at a frequency of 1 Hz and a heating rate of 4° C./minute.

As a comparison of example B1 with the comparison examples VB1 and VB2 from Table 2 shows, the melting point and the glass transition temperature of component (A1) are lowered considerably less by the addition of the component (A2) in accordance with the invention in the quantities in accordance with the invention than if larger quantities of component (A2) were added. The heat deflection temperature (HDT A) of the molding materials in accordance with the invention remains above 240° C.

A comparison of example B2 with comparison example VB4 shows that, with the same total lactam content, a higher melting point and a higher glass transition temperature are reached when component (A2) in accordance with the invention is added instead of caprolactam. The comparison of example B4 with comparison example VB3 also shows that a higher glass transition temperature is achieved by adding component (A2) than by adding caprolactam.

As Table 3 shows, the PA molding materials in accordance with the invention from examples B1 to B4 show a comparably good heat aging resistance as the molding materials from the comparison examples VB1 to VB4.

A comparably good heat aging resistance and heat deflection temperature as with the molding materials from the prior art are ensured by the specific feature combination of the present invention; very surprisingly, higher glass transition temperatures and higher melting points are achieved in this process.

Figure 1:
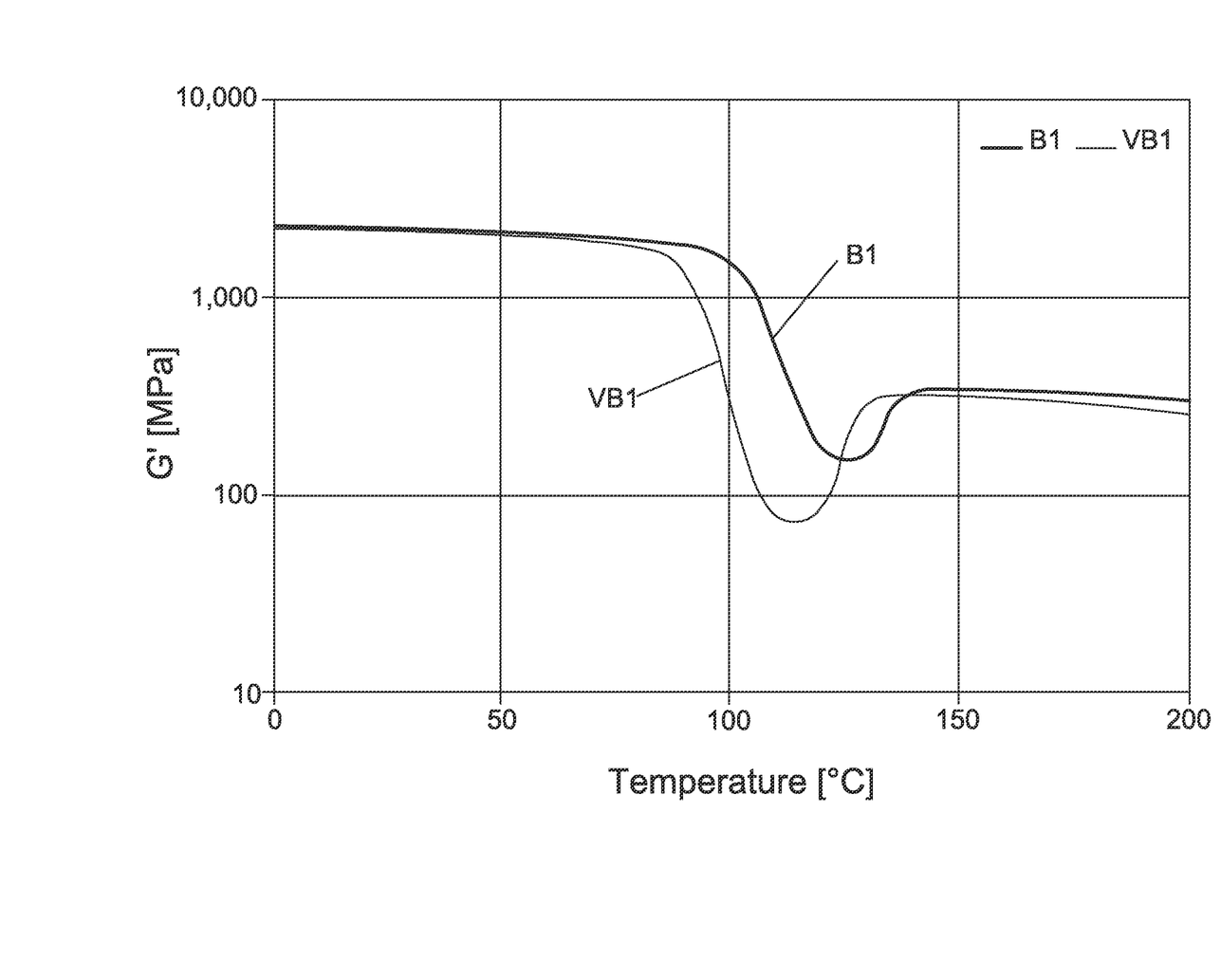
FIG. 1 depicts the storage modulus as a function of temperature for polyamide molding materials of invention example B1 and comparison example VB1.

The properties advantageous for use in practice of a higher glass transition temperature, namely the usability at higher temperatures, are documented by a comparison of the storage modulus curves (FIG. 1) of B1 with VB1. The storage modulus of VB1 already collapses at temperatures of 92° C. and falls below 1000 MPa, whereas in B1 a storage modulus of >1000 MPa is also maintained at 106° C. In addition, it can be seen from the curves that better cold crystallization occurs in the compositions in accordance with the invention.

The invention claimed is:

1. A polyamide molding material having the following composition:
   (A) 27 to 84.99% by weight of a polyamide mixture comprising
      (A1) at least one partially aromatic, partially crystalline polyamide differing from copolyamide 6.T/6 and having a melting point in the range from 255 to 330° C.; and
      (A2) at least one copolyamide 6.T/6 having a content of caprolactam of at least 50% by weight,
      wherein the sum of the caprolactam contained in polyamide (A1) and copolyamide (A2), amounts to 3 to 18% by weight with reference to the polyamide mixture;
   (B) 15 to 65% by weight of at least one filling and strengthening agent;
   (C) 0.01 to 3.0% by weight of at least one heat stabilizer;
   (D) 0 to 5.0% by weight of at least one additive,
   wherein the sum of components (A) to (D) amounts to 100% by weight, and wherein no metal salts and/or metal oxides of a transition metal of the group VB, VIB, VIIB or VIIIB of the periodic system are present in the polyamide molding material.

2. The polyamide molding material in accordance with claim 1, wherein the polyamide molding material contains 30 to 79.9% by weight of the polyamide mixture (A).

3. The polyamide molding material in accordance with claim 1, wherein the polyamide molding material has a storage modulus of >1000 MPa at temperatures of at least 93° C.

4. The polyamide molding material in accordance with claim 1, wherein the at least one partially aromatic, partially crystalline polyamide (A1) has a melting point in the range from 270 to 325° C., and/or a glass transition temperature in the range from 90 to 140° C.

5. The polyamide molding material in accordance with claim 1, wherein the at least one partially aromatic, partially crystalline polyamide (A1) has a solution viscosity $\eta_{rel}$ of at most 2.6.

6. The polyamide molding material in accordance with claim 1, wherein the at least one partially aromatic, partially crystalline polyamide (A1) is manufactured from
   a) dicarboxylic acids which contain at least 50 mol % terephthalic acid with respect to the total quantity of the dicarboxylic acids;
   b) diamines which contain at least 80 mol % aliphatic diamines having 4 to 18 carbon atoms with respect to the total quantity of the diamines, as well as optionally
   c) lactams and/or aminocarboxylic acids,
   wherein the copolyamide 6.T/6 is precluded.

7. The polyamide molding material in accordance with claim 1, wherein the at least one partially aromatic, partially crystalline polyamide (A1) is manufactured from
   a) 50 to 100 mol % terephthalic acid and/or naphthalene dicarboxylic acid as well as 0 to 50 mol % of at least one aliphatic dicarboxylic acid having 6 to 12 carbon atoms and/or 0 to 50 mol % of at least one cycloaliphatic dicarboxylic acid having 8 to 20 carbon atoms, and/or 0 to 50 mol % isophthalic acid, with respect to the total quantity of the dicarboxylic acids,
   b) 80 to 100 mol % of at least one aliphatic diamine having 4 to 18 carbon atoms, as well as 0 to 20 mol % of at least one cycloaliphatic diamine, and/or 0 to 20 mol % of at least one araliphatic diamine, with respect to the total quantity of the diamines, as well as, optionally,
   c) aminocarboxylic acids and/or lactams each having 6 to 12 carbon atoms.

8. The polyamide molding material in accordance with claim 1, wherein the at least one partially aromatic, partially crystalline polyamide (A1) is selected from PA 4T/4I, PA 4T/6I, PA 5T/5I, PA 6T/6I, PA 6T/6I/6, PA 6T/66, PA 6T/610, PA 10T/106, PA 6T/612, PA 6T/10T, PA 6T/10I, PA 9T, PA 10T, PA 12T, PA 10T/10I, PA10T/12, PA10T/11, PA 6T/9T, PA 6T/12T, PA 6T/10T/6I, PA 6T/6I/6, PA 6T/6I/12 and mixtures thereof.

9. The polyamide molding material in accordance with claim 1, wherein the at least one copolyamide 6.T/6 containing caprolactam (A2) has a solution viscosity $\eta_{rel}$ in the range from 1.6 to 3.0.

10. The polyamide molding material in accordance with claim 1, wherein the at least one filling and strengthening agent (B) is selected from the group comprising
    a) glass fibers and/or carbon fibers;
    b) particle-like fillers, and
    c) mixtures thereof.

11. The polyamide molding material in accordance with claim 1, wherein the at least one heat stabilizer (C) is selected from the group comprising
    a) compounds of monovalent or divalent copper;
    b) stabilizers based on secondary aromatic amines;
    c) stabilizers based on sterically hindered phenols;
    d) phosphites and phosphonites as well as
    e) mixtures thereof.

12. A polyamide molding material having the following composition:

(A) 27 to 79.9% by weight of a polyamide mixture comprising
   (A1) PA 6T/6I/6, and
   (A2) at least one copolyamide 6.T/6 having a content of caprolactam of at least 50% by weight,
   wherein the sum of the caprolactam contained in polyamide (A1) and copolyamide (A2), amounts to 8 to 18% by weight with reference to the polyamide mixture;
(B) 20 to 65% by weight glass fibers as well as phyllosilicates;
(C) 0.1 to 3.0% by weight of a heat stabilizer containing at least one compound of the monovalent or divalent copper;
(D) 0 to 5.0% by weight of at least one additive,
wherein the sum of components (A)-(D) amounts to 100% by weight.

13. A molding manufactured from a polyamide molding material in accordance with claim 1.

14. The polyamide molding material in accordance with claim 1, wherein the sum of the caprolactam contained in polyamide (A1) and copolyamide 6.T/6 (A2) amounts to 5 to 18% by weight with respect to the polyamide mixture.

15. The polyamide molding material in accordance with claim 14, wherein the sum of the caprolactam contained in polyamide (A1) and copolyamide 6.T/6 (A2) amounts to 7 to 18% by weight with respect to the polyamide mixture.

16. The polyamide molding material in accordance with claim 2, wherein the polyamide molding material contains 35 to 70% by weight of the polyamide mixture (A).

17. The polyamide molding material in accordance with claim 3, wherein the polyamide molding material has a storage modulus of >1000 MPa at temperatures of at least 98° C.

18. The polyamide molding material in accordance with claim 4, wherein the at least one partially aromatic, partially crystalline polyamide (A1) has a melting point in the range from 280 to 320° C., and/or a glass transition temperature in the range from 110 to 140° C.

* * * * *